United States Patent
Hongyo et al.

(10) Patent No.: US 12,323,068 B2
(45) Date of Patent: Jun. 3, 2025

(54) POWER CONVERSION DEVICE

(71) Applicant: Mitsubishi Electric Corporation, Tokyo (JP)

(72) Inventors: Akane Hongyo, Tokyo (JP); Yuki Taniyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 18/255,269

(22) PCT Filed: Jan. 14, 2021

(86) PCT No.: PCT/JP2021/001079
§ 371 (c)(1),
(2) Date: May 31, 2023

(87) PCT Pub. No.: WO2022/153448
PCT Pub. Date: Jul. 21, 2022

(65) Prior Publication Data
US 2024/0007010 A1 Jan. 4, 2024

(51) Int. Cl.
*H02M 5/458* (2006.01)
*H02M 1/12* (2006.01)
(Continued)

(52) U.S. Cl.
CPC .......... *H02M 5/458* (2013.01); *H02M 1/126* (2013.01); *H02M 1/14* (2013.01); *H02M 7/5387* (2013.01); *H02P 27/06* (2013.01); *H02P 29/50* (2016.02)

(58) Field of Classification Search
CPC ...... H02M 7/5387; H02M 1/14; H02M 1/126; H02M 5/458; H02P 29/50; H02P 27/06
See application file for complete search history.

(56) References Cited

U.S. PATENT DOCUMENTS 5,959,430 A       9/1999   Yuki et al.
10,848,073 B2 *  11/2020   Shikagawa ............. H02M 1/32
(Continued)

FOREIGN PATENT DOCUMENTS

EP    3522363 A1    8/2019
JP    H10-248300 A  9/1998
(Continued)

OTHER PUBLICATIONS

International Search Report of the International Searching Authority mailed Mar. 30, 2021 in corresponding International Application No. PCT/JP2021/001079.
(Continued)

*Primary Examiner* — Adolf D Berhane
(74) *Attorney, Agent, or Firm* — Posz Law Group, PLC

(57) ABSTRACT

A power conversion device includes: a switching signal generator configured to generate a switching signal to output, from an inverter circuit, an AC voltage corresponding to a designated phase; a speed estimator configured to estimate an estimated phase of a rotor of a motor based on a current flowing through the motor; and a beat suppression controller configured to output an adjusted phase to the switching signal generator so as to suppress a beat component superimposed on the current flowing through the motor, the adjusted phase being obtained by adjusting the estimated phase.

10 Claims, 7 Drawing Sheets

(51) Int. Cl.
    *H02M 1/14*     (2006.01)
    *H02M 7/5387*     (2007.01)
    *H02P 27/06*     (2006.01)
    *H02P 29/50*     (2016.01)

(56) References Cited

U.S. PATENT DOCUMENTS

| | | |
|---|---|---|
| 2010/0118569 A1 | 5/2010 | Kono et al. |
| 2014/0232309 A1 | 8/2014 | Zhou et al. |
| 2014/0247003 A1 | 9/2014 | Yamasaki et al. |
| 2019/0245469 A1* | 8/2019 | Matsuda ................ H02P 27/06 |
| 2020/0007049 A1 | 1/2020 | Kitano et al. |
| 2023/0327573 A1* | 10/2023 | Tagawa ................ H02M 7/219 |
| | | 318/504 |
| 2025/0062679 A1* | 2/2025 | Taniyama ................ H02P 27/08 |

FOREIGN PATENT DOCUMENTS

| | | |
|---|---|---|
| JP | H11-089297 A | 3/1999 |
| JP | 2013-085455 A | 5/2013 |
| JP | 2017-046430 A | 3/2017 |
| JP | 2018-057195 A | 4/2018 |
| WO | 2008/139518 A1 | 11/2008 |
| WO | 2013/108374 A1 | 7/2013 |

OTHER PUBLICATIONS

Office Action dated Jun. 11, 2024 issued for the corresponding Japanese Patent Application No. 2022-574959 (and English translation).
Extended European Search Report mailed Feb. 2, 2024 for the corresponding European Patent Application No. 21919342.2.

* cited by examiner

FIG.4
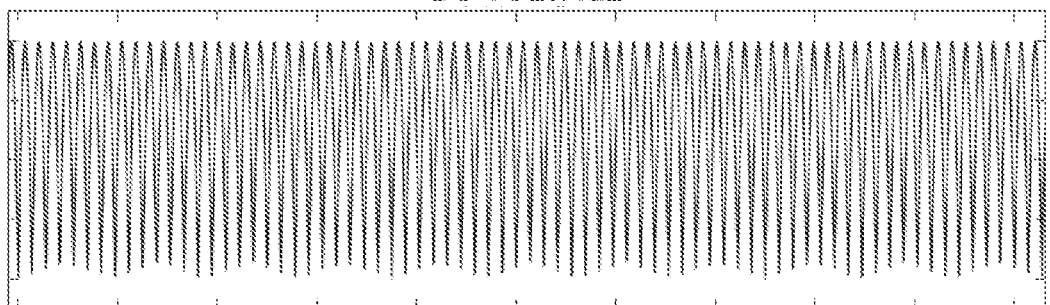
DC VOLTAGE
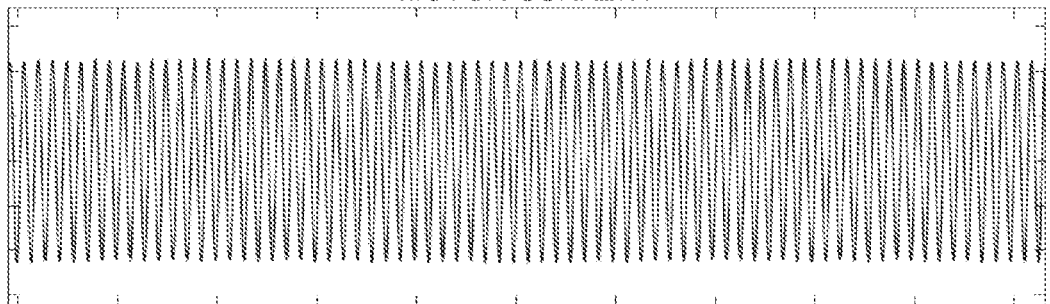
MOTOR CURRENT
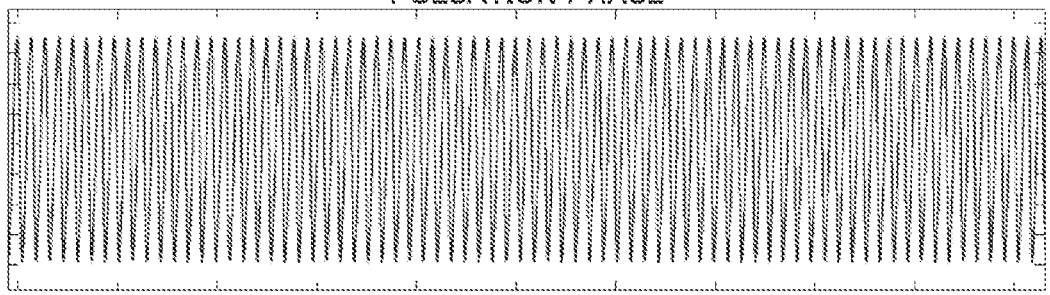
PULSATION PHASE

POWER CONVERSION DEVICE

CROSS REFERENCE TO RELATED APPLICATION

This application is a U.S. national stage application of PCT/JP2021/001079 filed on Jan. 14, 2021, the contents of which are incorporated herein by reference.

TECHNICAL FIELD

The present disclosure relates to a power conversion device.

BACKGROUND

In a power conversion device including a rectifier circuit configured to convert an AC voltage into a DC voltage and an inverter circuit configured to convert the DC voltage into an AC voltage, pulsation of a frequency six times as large as a frequency of the AC voltage input to the rectifier circuit occurs in the DC voltage output from the rectifier circuit. Such pulsation is reduced by increasing a capacitance of a capacitor provided at a DC link portion between the rectifier circuit and the inverter circuit. For example, the pulsation is reduced by a large-capacitance electrolytic capacitor. However, the large capacitance of the capacitor leads to increased cost and volume of the capacitor. Therefore, there has been known a power conversion device (hereinafter, also referred to as "electrolytic capacitor-less inverter") in which a small-capacitance film capacitor or ceramic capacitor permitting pulsation is provided at a DC link portion.

When pulsation occurs in the DC voltage, a beat component corresponding to the pulsation frequency can be superimposed on a current output from the inverter circuit. When a load connected to the power conversion device is a motor, vibration or noise is generated in the motor due to the beat component.

In order to suppress the beat component generated in the electrolytic capacitor-less inverter, Japanese Patent Laying-Open No. 2013-85455 (PTL 1) discloses a control method in which a phase of a resultant voltage vector from a q-axis pulsates depending on a pulsation component of a DC voltage, the resultant voltage vector being a resultant voltage vector of a d-axis voltage vector and a q-axis voltage vector of a motor.

PATENT LITERATURE

PTL 1: Japanese Patent Laying-Open No. 2013-85455

In the technology described in PTL 1, it is necessary to obtain the d-axis voltage vector and the q-axis voltage vector of the motor using a position sensor such as a pulse encoder or a resolver, for example. Therefore, cost is increased by the position sensor. Further, when the motor is included in a compressor of an air conditioner, it is difficult to install the position sensor because the compressor is brought into a high-temperature and high-pressure state.

SUMMARY

The present disclosure has been made to solve the above-described problem, and has an object to provide a power conversion device that can suppress a beat component superimposed on a current flowing through a motor without increasing cost.

A power conversion device according to an aspect of the present disclosure comprises: a rectifier circuit configured to rectify an AC voltage to a DC voltage; an inverter circuit; a DC link capacitor; and a generator. The inverter circuit is configured to convert, into an AC voltage, the DC voltage rectified by the rectifier circuit and output the converted AC voltage to a motor. The DC link capacitor is connected between the rectifier circuit and the inverter circuit. The generator is configured to generate a signal for controlling the inverter circuit to output, from the inverter circuit, an AC voltage corresponding to a designated phase. The power conversion device further includes an estimator and a beat suppression controller. The estimator is configured to estimate a first phase of a rotor of the motor based on a current flowing through the motor. The beat suppression controller is configured to output a second phase to the generator as the designated phase so as to suppress a beat component superimposed on the current flowing through the motor, the second phase being obtained by adjusting the first phase.

According to the present disclosure, the first phase of the rotor of the motor is estimated based on the current flowing through the motor. Therefore, no position sensor is required to detect the position of the rotor of the motor, unlike the technology described in PTL 1. Further, the second phase is generated by adjusting the first phase to suppress the beat component superimposed on the current flowing through the motor. Moreover, the inverter circuit is controlled to output, from the inverter circuit, the AC voltage corresponding to the second phase. Thus, the beat component is suppressed. In the manner described above, the beat component superimposed on the current flowing through the motor can be suppressed without increasing cost.

BRIEF DESCRIPTION OF DRAWINGS

FIG. 4 is a diagram showing waveforms of a DC voltage, a current flowing through a motor, and a pulsation phase added to an estimated phase in a power conversion device including a beat suppression controller.

DETAILED DESCRIPTION

Figure 1:
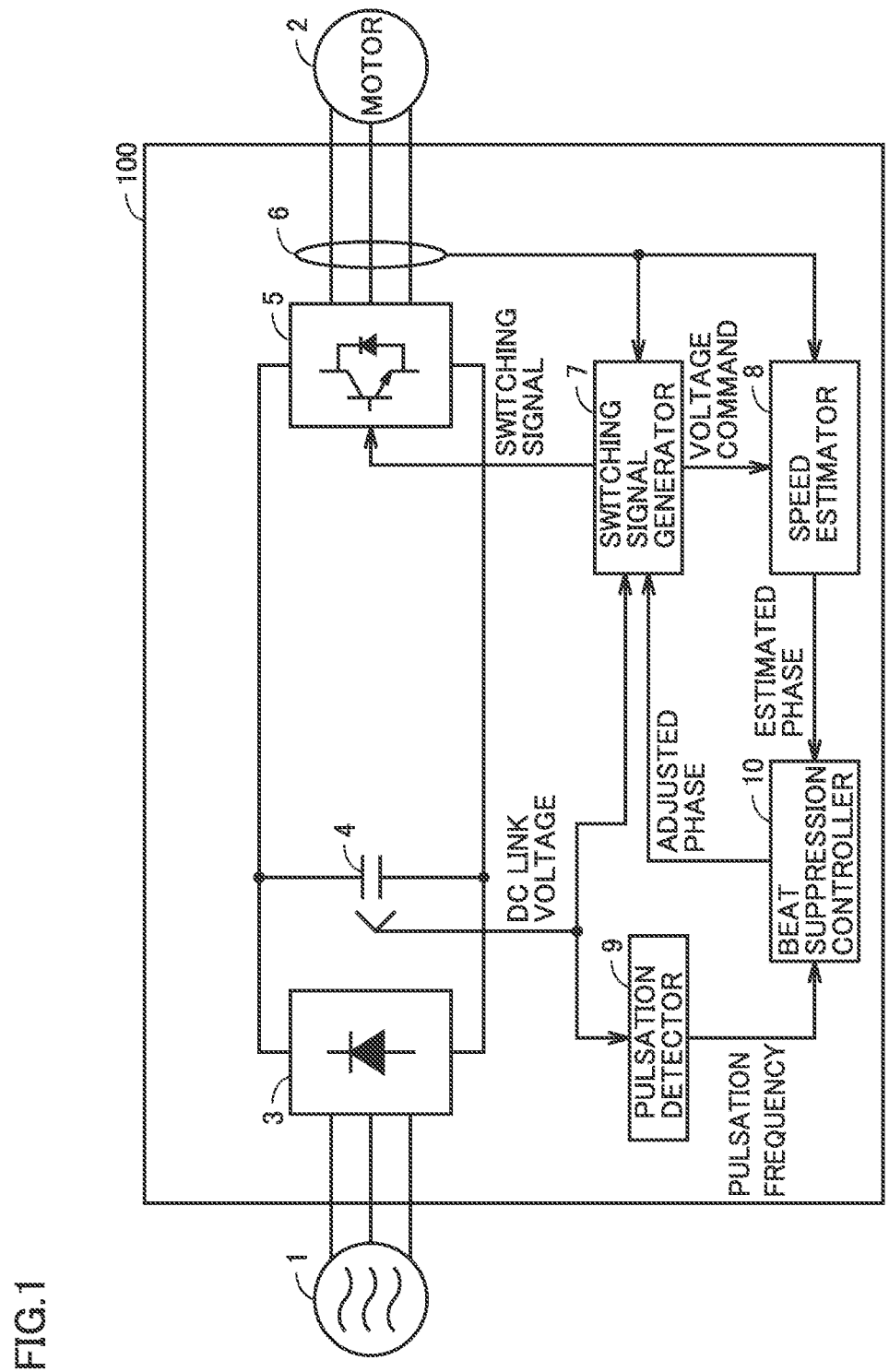
FIG. 1 is a diagram showing an exemplary overall configuration of a power conversion device according to a first embodiment.

Hereinafter, embodiments of the present disclosure will be described in detail with reference to figures. It should be noted that in the figures, the same or corresponding portions are denoted by the same reference characters, and will not be described repeatedly in principle. In the figures described below, a relation in size between respective components may be different from an actual relation therebetween.

First Embodiment (Overall Configuration of Power Conversion Device)

FIG. 1 is a diagram showing an exemplary overall configuration of a power conversion device 100 according to a first embodiment. As shown in FIG. 1, an AC power supply 1 and a motor 2 serving as a load are connected to power conversion device 100. AC power supply 1 is, for example, a three-phase commercial power supply. Motor 2 is, for example, a permanent magnet synchronous motor.

Power conversion device 100 includes a rectifier circuit 3, a DC link capacitor 4, an inverter circuit 5, a current detector 6, and a switching signal generator 7.

Rectifier circuit 3 rectifies an AC voltage input from AC power supply 1 to convert it into a DC voltage. The DC voltage rectified by rectifier circuit 3 includes a low-order harmonic component (hereinafter, referred to as "pulsation component") that pulsates at a frequency six times as large as a voltage frequency of AC power supply 1. Rectifier circuit 3 is, for example, a full bridge circuit including six rectifier diodes. It should be noted that rectifier circuit 3 may use a switching element such as a transistor instead of the rectifier diodes.

Inverter circuit 5 converts the DC voltage rectified by rectifier circuit 3 into an AC voltage, and outputs the converted AC voltage to motor 2. Inverter circuit 5 is, for example, a full bridge circuit including six IGBTs (Insulated Gate Bipolar Transistors). A freewheeling diode is connected to each MGT in antiparallel. Each IGBT is controlled to be brought into one of an ON state and an OFF state independently in accordance with a switching signal output from switching signal generator 7. By this control, inverter circuit 5 converts the DC voltage into an AC voltage. It should be noted that inverter circuit 5 may use a switching element such as a MOSFET (Metal-Oxide-Semiconductor Field-Effect Transistor) instead of the IGBTs.

DC link capacitor 4 is connected between rectifier circuit 3 and inverter circuit 5. A capacitance of DC link capacitor 4 is small to such an extent that the pulsation component of the DC voltage output from rectifier circuit 3 is not smoothed. It should be noted that the capacitance of DC link capacitor 4 is large to such an extent that a high-order harmonic component resulting from a switching operation of inverter circuit 5 is smoothed. DC link capacitor 4 is, for example, a film capacitor or a ceramic capacitor.

Current detector 6 detects a current flowing through motor 2, and outputs current information indicating the detected current. Current detector 6 is, for example, a current sensor using a current transformer, called CT, for instruments. It should be noted that current detector 6 may detect the current flowing through motor 2 by using a single-shunt current detection method or a three-shunt current detection method. The single-shunt current detection method is a method that uses a shunt resistor provided at a negative DC bus of power conversion device 100. The three-shunt current detection method is a method that uses shunt resistors provided in series with switching elements on the lower side of inverter circuit 5.

Switching signal generator 7 generates a switching signal for controlling inverter circuit 5, based on an operation command input from outside such as a speed command or a torque command. Switching signal generator 7 generates the switching signal to output, from inverter circuit 5, an AC voltage corresponding to a designated phase. The generated switching signal is output to inverter circuit 5.

As a method of controlling a speed or a torque, for example, vector control to feedback-control the current flowing through motor 2 using a dq coordinate system can be employed. The current flowing through motor 2 is indicated by current information output from current detector 6. Switching signal generator 7 calculates a voltage command in the dq coordinate system through the vector control using the current information output from current detector 6. Then, switching signal generator 7 uses the designated phase to convert the voltage command calculated in the dq coordinate system into that in a three-phase coordinate system. Thus, an AC voltage corresponding to the designated phase is output from inverter circuit 5.

It should be noted that switching signal generator 7 may generate the switching signal using V/f constant control for outputting a voltage proportional to an operation frequency of motor 2, or using direct torque control for controlling magnetic flux and torque of motor 2.

As described above, the DC voltage rectified by rectifier circuit 3 includes the pulsation component that pulsates at the frequency six times as large as the voltage frequency of AC power supply 1. This pulsation component is not smoothed by DC link capacitor 4. Therefore, a beat component resulting from the pulsation component can be superimposed on the current flowing through motor 2. When a difference is small between a frequency (hereinafter, referred to as "pulsation frequency") of the pulsation component and a frequency (hereinafter, referred to as "operation frequency of motor 2") of the AC voltage output from inverter circuit 5, a large beat component is likely to occur. As a configuration for suppressing the beat component, power conversion device 100 according to the present embodiment further includes a speed estimator 8, a pulsation detector 9, and a beat suppression controller 10.

Speed estimator 8 estimates rotation speed and magnetic pole position of a rotor of motor 2 using the current information output from current detector 6 and the voltage command calculated by switching signal generator 7. Speed estimator 8 estimates rotation speed and magnetic pole position of the rotor of motor 2 using a known estimation method. As the estimation method, a method of calculating it in accordance with a speed electromotive force of motor 2 is generally employed. For example, a method such as an arctangent method or an adaptive flux observer method can be employed. Speed estimator 8 outputs the estimated magnetic pole position, i.e., estimated phase, to beat suppression controller 10.

Pulsation detector 9 detects the pulsation frequency in accordance with a DC voltage applied across DC link capacitor 4, and outputs the detection result to beat suppression controller 10. Since DC link capacitor 4 has a small capacitance as described above, the DC voltage applied across DC link capacitor 4 pulsates at the pulsation frequency about six times as large as the voltage frequency of AC power supply 1. Pulsation detector 9 detects this pulsation frequency. For example, pulsation detector 9 detects the pulsation frequency by allowing the value of the DC voltage to pass through a band pass filter. Alternatively, pulsation detector 9 may detect the pulsation frequency by subtracting, from the value of the original DC voltage, a result obtained by allowing the value of the DC voltage to pass through a notch filter.

Beat suppression controller 10 outputs, to switching signal generator 7, an adjusted phase obtained by adjusting the estimated phase output from speed estimator 8 so as to suppress the beat component superimposed on the current flowing through motor 2. Switching signal generator 7 uses the adjusted phase as the designated phase.

(Internal Configurations of Switching Signal Generator and Beat Suppression Controller)

Figure 2:
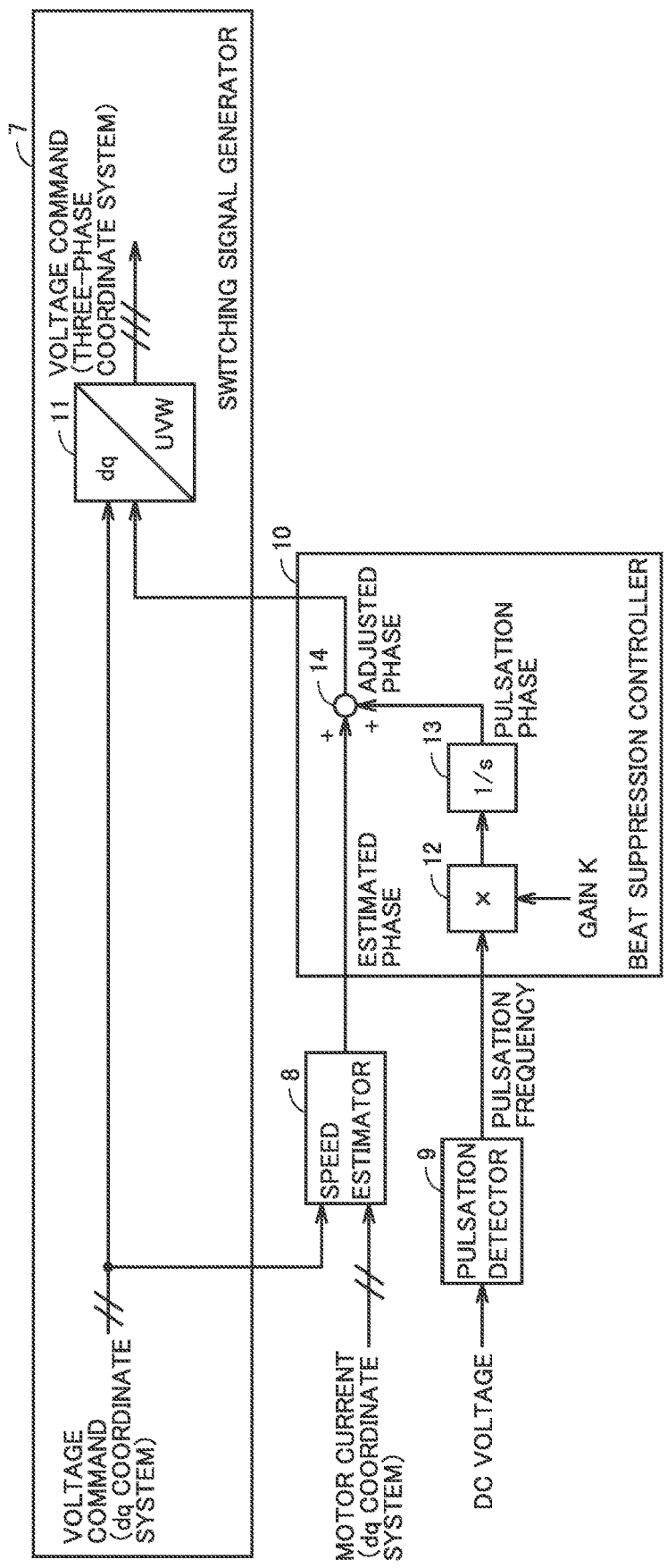
FIG. 2 is a diagram showing exemplary internal configurations of a switching signal generator and a beat suppression controller.

FIG. 2 is a diagram showing exemplary internal configurations of switching signal generator 7 and beat suppression controller 10. As shown in FIG. 2, switching signal generator 7 includes a converter 11. Converter 11 uses a designated phase θ to convert a voltage commands Vd*, Vq* in the dq coordinate system into voltage commands Vu*, Vv*, Vw* in the three-phase coordinate system in accordance with the following conversion formula. Switching signal generator 7 generates a switching signal for controlling inverter circuit 5 using voltage commands Vu*, Vv*, Vw*.

$$\begin{pmatrix} Vu^* \\ Vv^* \\ Vw^* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta & -\sin\theta \\ \sin\theta & \cos\theta \end{pmatrix} \begin{pmatrix} Vd^* \\ Vq^* \end{pmatrix} \quad \text{[Formula 1]}$$

Beat suppression controller 10 includes an amplifier 12, an integrator 13, and an adder 14. Amplifier 12 multiplies, by a gain K, the pulsation frequency output from pulsation detector 9. Gain K is determined in accordance with the voltage frequency of AC power supply 1 and the magnitude of the DC voltage across DC link capacitor 4. Gain K may be a fixed value determined in advance. Alternatively, gain K may be a variable value determined in accordance with states of AC power supply 1 and motor 2.

Integrator 13 outputs an integral value of the output of amplifier 12. The integral value indicates a phase (hereinafter, referred to as "pulsation phase") of the pulsation component included in the DC voltage.

Adder 14 outputs, as the adjusted phase, a phase obtained by adding the estimated phase output from speed estimator 8 and the pulsation phase output from integrator 13. Thus, beat suppression controller 10 adjusts the estimated phase using the pulsation phase that is an integral value of the pulsation frequency.

(Suppression of Beat Component)

Figure 3:
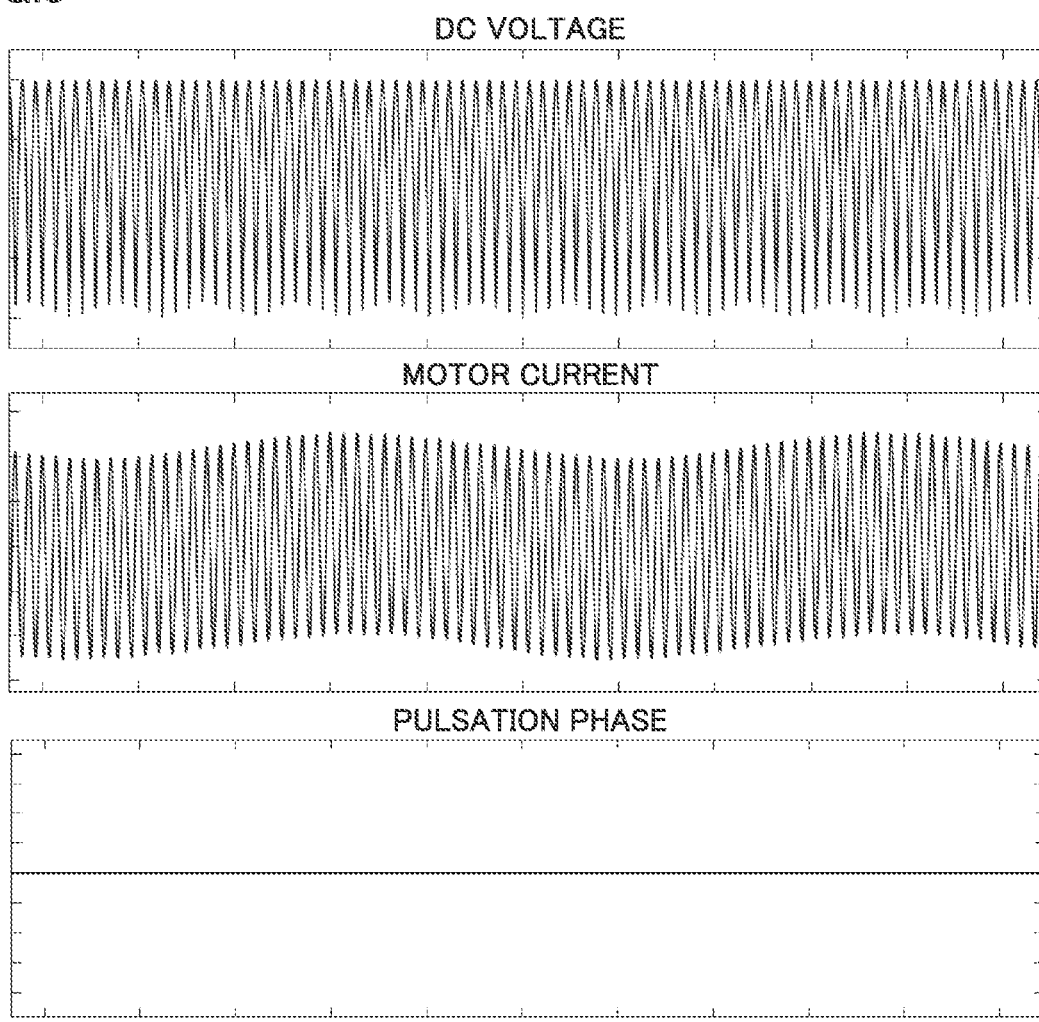
FIG. 3 is a diagram showing waveforms of a DC voltage, a current flowing through a motor, and a pulsation phase added to an estimated phase in a power conversion device including no beat suppression controller.

FIG. 3 is a diagram showing waveforms of a DC voltage, a current flowing through a motor, and a pulsation phase added to an estimated phase in a power conversion device including no beat suppression controller 10. FIG. 4 is a diagram showing waveforms of the DC voltage, the current flowing through the motor, and the pulsation phase added to the estimated phase in power conversion device 100 including beat suppression controller 10. In each of FIGS. 3 and 4, the vertical axis of the graph at the upper part represents the DC voltage, the vertical axis of the graph at the intermediate part represents current flowing through motor 2, and the vertical axis of the graph at the lower part represents the pulsation phase. The horizontal axis of each graph represents elapsed time.

As shown in FIG. 3, in the case of the power conversion device including no beat suppression controller 10, the pulsation phase added to the estimated phase is zero. In this case, switching signal generator 7 converts the voltage command in the dq coordinate system into the voltage command in the three-phase coordinate system using the estimated phase. Therefore, the current flowing through motor 2 is influenced by the pulsation component included in the DC voltage, and therefore includes the beat component as shown in the intermediate part of FIG. 3. In particular, when the pulsation frequency is close to the operation frequency of motor 2, a large beat component appears.

As shown in FIG. 4, in the case of power conversion device 100 including beat suppression controller 10, switching signal generator 7 converts the voltage command in the dq coordinate system into the voltage command in the three-phase coordinate system using the adjusted phase obtained by adding the pulsation phase shown in the lower part to the estimated phase. Thus, the influence of the pulsation component included in the DC voltage is canceled in the AC voltage output from inverter circuit 5. Therefore, as shown in the intermediate part, no beat component appears in the current flowing through motor 2.

Thus, according to power conversion device 100 of the first embodiment, the estimated phase of the rotor of motor 2 is estimated based on the current flowing through motor 2. Therefore, no position sensor is required to detect the position of the rotor of motor 2, unlike the technology described in PTL 1. Further, the adjusted phase is generated by adjusting the estimated phase so as to suppress the beat component superimposed on the current flowing through motor 2. Moreover, inverter circuit 5 is controlled to output, from inverter circuit 5, the AC voltage corresponding to the adjusted phase. Thus, the beat component is suppressed. In view of the above, the beat component superimposed on the current flowing through motor 2 can be suppressed without increasing cost.

Further, the technology disclosed in PTL 1 requires phase information of a voltage in the dq coordinate system. The phase information is calculated, for example, from a d-axis voltage Vd and a q-axis voltage Vq using an arctangent function (Arctan). However, the calculation of the arctangent function involves a large computational load, requires a high-performance microcomputer, and leads to increased cost. However, in power conversion device 100 according to the first embodiment, the computation load is reduced, thus suppressing increased cost for the microcomputer.

Second Embodiment

Figure 5:
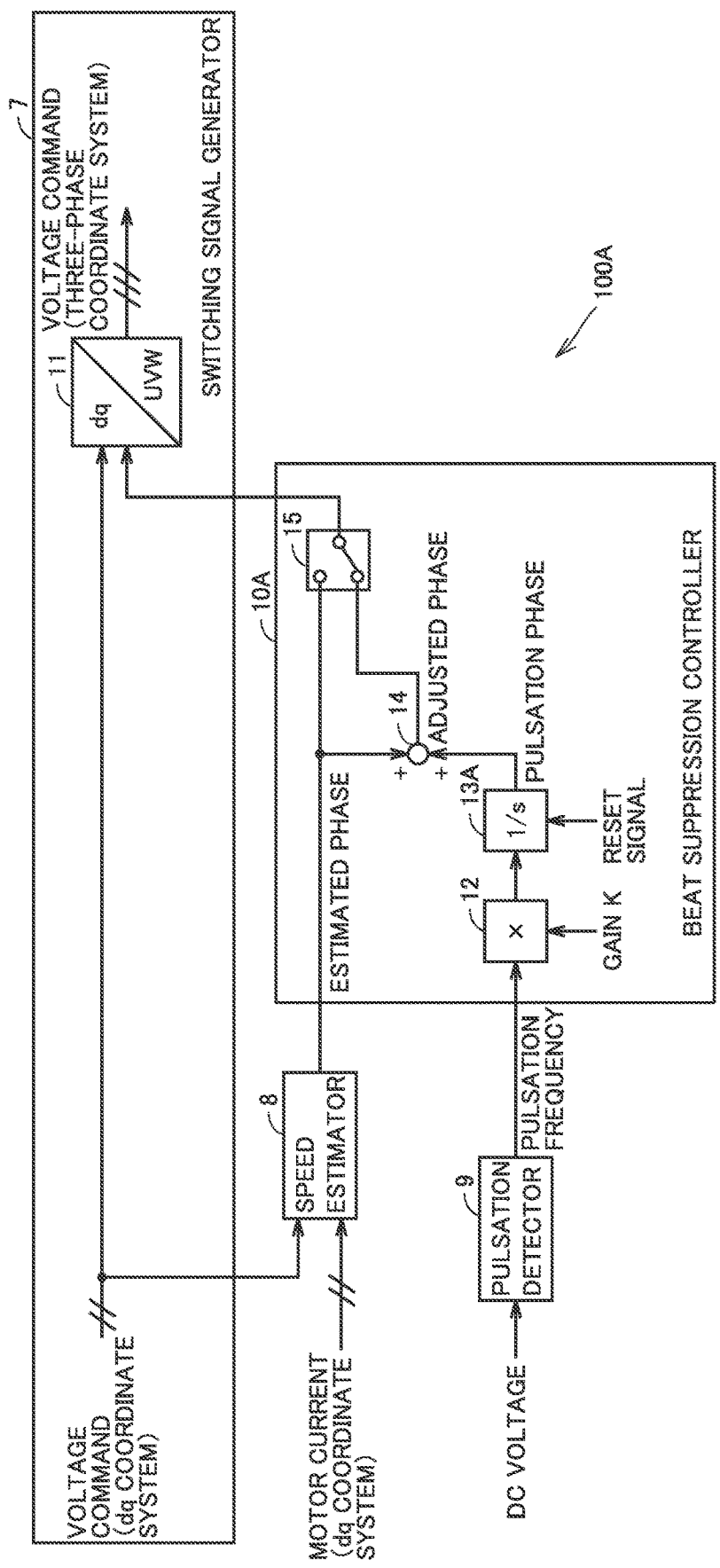
FIG. 5 is a diagram showing a portion of a configuration of a power conversion device according to a second embodiment.

FIG. 5 is a diagram showing a portion of a configuration of a power conversion device according to a second embodiment. As shown in FIG. 5, a power conversion device 100A according to the second embodiment is different from power conversion device 100 according to the first embodiment in that a beat suppression controller 10A is provided instead of beat suppression controller 10.

Beat suppression controller 10A is different from beat suppression controller 10 in that beat suppression controller 10A includes an integrator 13A instead of integrator 13 and includes a switch 15. As with integrator 13, integrator 13A integrates an output of amplifier 12 so as to output an integrated value (i.e., pulsation phase). Integrator 13A resets the integral value to zero in response to input of a reset signal.

Switch 15 switches between a first mode and a second mode, the first mode being a mode in which the adjusted phase is output to switching signal generator 7, the second mode being a mode in which the estimated phase is output to switching signal generator 7. Switch 15 switches from the second mode to the first mode in response to a predetermined operation condition being satisfied, and switches from the first mode to the second mode in response to the operation condition being not satisfied.

The operation condition is, for example, a condition that motor 2 is not undergoing acceleration/deceleration. Alternatively, the operation condition may be a condition that the magnitude (amplitude) of the pulsation included in the DC voltage across DC link capacitor 4 is equal to or more than a reference value. Alternatively, the operation condition may include a plurality of conditions. When the operation condition includes such a plurality of conditions, it may be determined that the operation condition is satisfied when all of the plurality of conditions are satisfied, or it may be determined that the operation condition is satisfied when at least one of the plurality of conditions is satisfied.

Beat suppression controller 10A inputs, to integrator 13A, a reset signal for resetting the pulsation phase to zero, before switching from the second mode to the first mode by switch 15. Specifically, beat suppression controller 10A inputs the reset signal to integrator 13A while the second mode is selected by switch 15.

Figure 6:
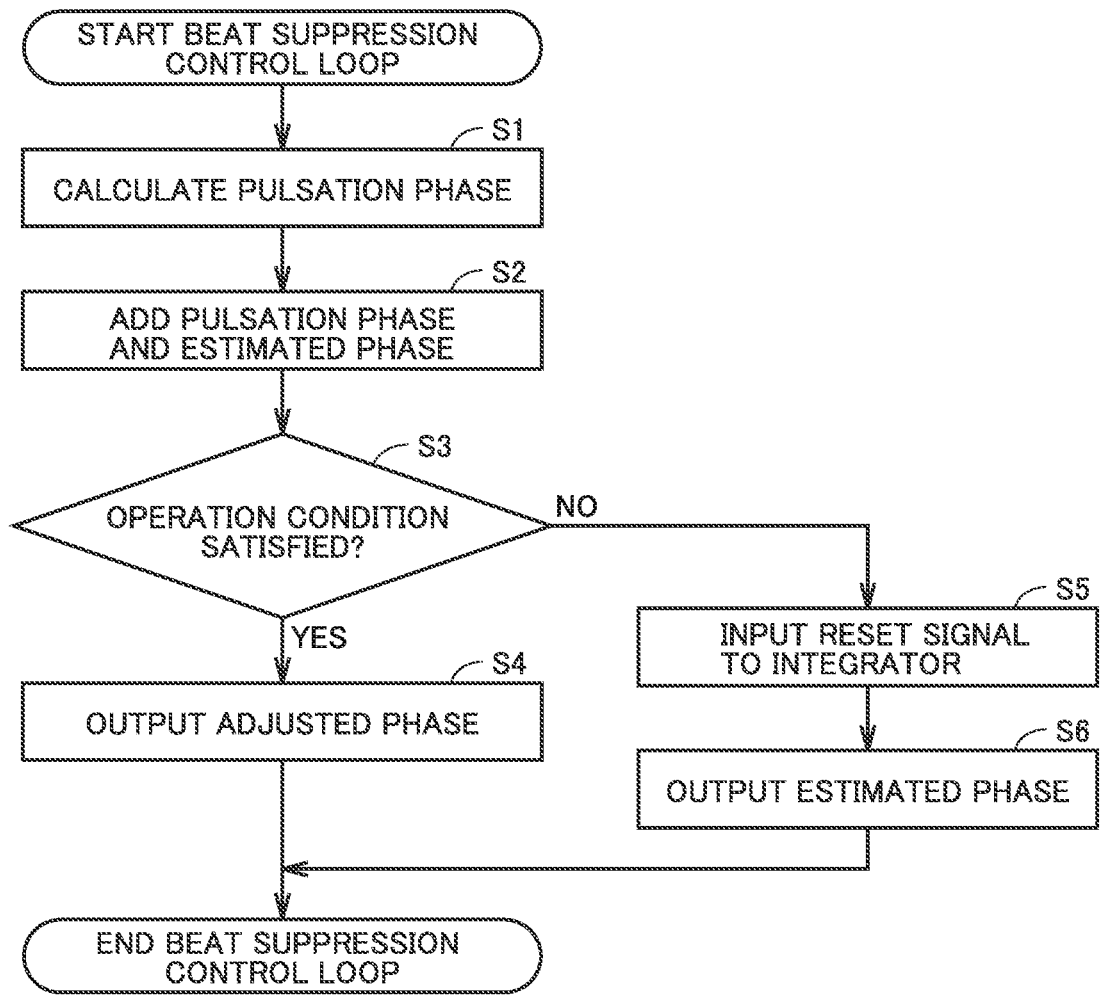
FIG. 6 is a flowchart showing a flow of a beat suppression control process in the power conversion device according to the second embodiment.

FIG. 6 is a flowchart showing a flow of a beat suppression control process in power conversion device 100A according to the second embodiment. Steps S1 to S6 shown in FIG. 6 are repeatedly performed.

In step S1, beat suppression controller 10A calculates the pulsation phase by integrating the value obtained by multiplying the pulsation frequency by gain K. Next, in step S2, beat suppression controller 10A adds the pulsation phase to the estimated phase, thereby generating the adjusted phase.

Next, in step S3, switch 15 determines whether or not the operation condition is satisfied. When the operation condition is satisfied (YES in step S3), switch 15 selects the first mode and outputs the adjusted phase to switching signal generator 7 (step S4). After step S4, power conversion device 100A ends the beat suppression control process.

When the operation condition is not satisfied (NO in step S3), beat suppression controller 10A inputs the reset signal to integrator 13A (step S5). Switch 15 outputs the estimated phase to switching signal generator 7 (step S6). After step S6, power conversion device 100A ends the beat suppression control process.

When motor 2 is undergoing acceleration/deceleration, the output value of speed estimator 8 is not stable. Therefore, when switching signal generator 7 performs the conversion using the adjusted phase, the effect of suppressing the beat component may not be sufficiently exhibited or diverging may be resulted in the control. Since the operation condition includes the condition that motor 2 is not undergoing acceleration/deceleration, the estimated phase is output to switching signal generator 7 when motor 2 is undergoing acceleration/deceleration. As a result, diverging in the control can be prevented.

When the pulsation component included in the DC voltage is small, the beat component is less likely to be superimposed on the current flowing through motor 2, so that it is not necessary to suppress the beat component using the adjusted phase. Therefore, since the operation condition includes the condition that the magnitude of the pulsation included in the DC voltage across DC link capacitor 4 is equal to or more than the reference value, the suppression of the beat component using the adjusted phase is not performed when the pulsation component included in the DC voltage is small.

When the value of the phase input to switching signal generator 7 is greatly changed upon switching from the second mode to the first mode, loss of synchronization may occur in motor 2. The loss of synchronization is such a phenomenon that motor 2 cannot follow a pulse signal and stops rotation.

When the reset signal is input to integrator 13A in step S5 as described above, the pulsation phase output from integrator 13A is reset to zero in the second mode. That is, the pulsation phase is reset to zero before switching from the second mode to the first mode. Therefore, when switching from the second mode to the first mode, an amount of change in the value of the phase input to switching signal generator 7 is suppressed. Thus, when switching from the second mode to the first mode, occurrence of the loss of synchronization in motor 2 is suppressed, with the result that the beat suppressing effect is gradually exhibited.

Third Embodiment

Figure 7:
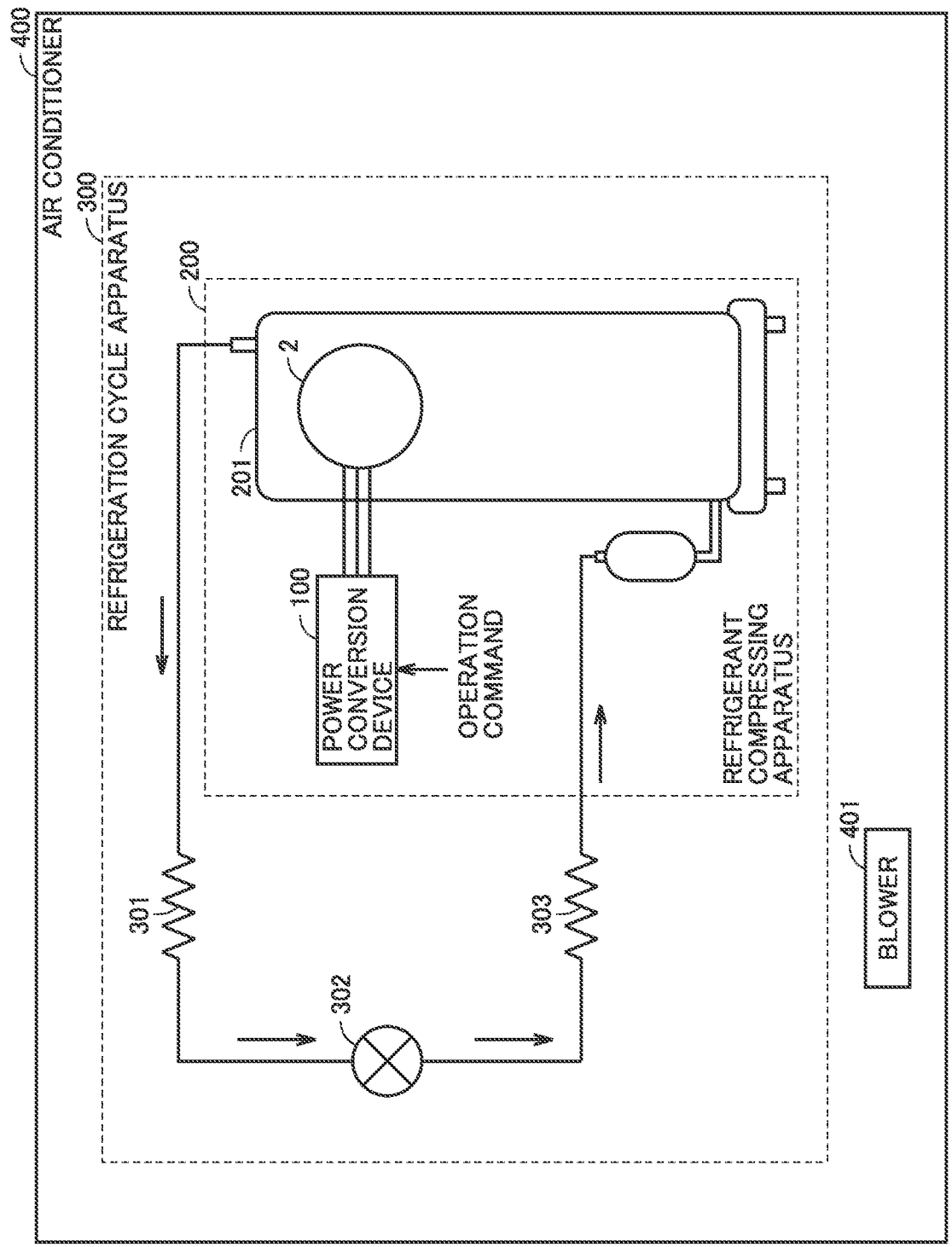
FIG. 7 is a schematic diagram showing an air conditioner according to a third embodiment.

FIG. 7 is a schematic diagram showing an air conditioner 400 according to a third embodiment. Air conditioner 400 includes a refrigeration cycle apparatus 300 and a blower 401. Refrigeration cycle apparatus 300 includes a refrigerant compressing apparatus 200, a condenser 301, an expansion valve 302, and an evaporator 303. Refrigerant compressing apparatus 200 has a compressor 201 and power conversion device 100 described above.

As shown in FIG. 7, compressor 201 and condenser 301 are connected together by a tube. Similarly, condenser 301 and expansion valve 302 are connected together by a tube, expansion valve 302 and evaporator 303 are connected together by a tube, and evaporator 303 and compressor 201 are connected together by a tube. Thus, refrigerant circulates through compressor 201, condenser 301, expansion valve 302, and evaporator 303.

Motor 2 shown in FIG. 7 is provided in compressor 201 of air conditioner 400, and is subject to variable speed control by power conversion device 100 in order to compress refrigerant gas into high-pressure gas. In refrigeration cycle apparatus 300, processes of evaporation, compression, condensation, and expansion of the refrigerant are repeatedly performed. Further, the refrigerant is changed from liquid to gas and is further changed from gas to liquid, thereby performing heat exchange between the refrigerant and outside air. Therefore, air conditioner 400 is constructed by combining refrigeration cycle apparatus 300 with blower 401 configured to circulate the outside air.

An air conditioner in recent years is required to attain not only comfortability but also high efficiency due to tightened regulation for energy saving. Moreover, a demand for air conditioners is being increased in emerging countries. Therefore, it is important to provide an inexpensive air conditioner that uses a power conversion device for variable speed control of a motor. Since power conversion device 100 includes inexpensive small-capacitance DC link capacitor 4, these requirements can be satisfied.

When the beat component appears in the current flowing through motor 2 while the operation frequency of motor 2 and the pulsation frequency of the DC voltage are close to each other, vibration and noise may be generated from compressor 201 or the tube connected to compressor 201. As a result, comfortability of the user is compromised. Further, since the pulsation is superimposed on a work performed by motor 2, efficiency of compression of the refrigerant gas is also decreased. Moreover, when an operation is performed while avoiding the operation frequency at which the beat component is generated, an optimum operation of the refrigeration cycle apparatus cannot be performed, thus resulting in decreased cycle efficiency. However, by using power conversion device 100 including beat suppression controller 10, occurrence of the beat component is suppressed. As a result, these problems are solved.

As described above, air conditioner 400 includes power conversion device 100 including small-capacitance DC link capacitor 4 and beat suppression controller 10. Thus, inexpensive air conditioner 400 allowing for comfortability and high efficiency is provided. It should be noted that air conditioner 400 may include power conversion device 100A instead of power conversion device 100. Also in this case, inexpensive air conditioner 400 allowing for comfortability and high efficiency is provided.

In the description above, air conditioner 400 has been described as an example to which each of power conversion devices 100, 100A is applied; however, each of power conversion devices 100, 100A can also be used for other devices. For example, each of power conversion devices 100, 100A may be applied to a mechanical device such as a fan or a pump.

The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims.

The invention claimed is:

1. A power conversion device comprising:
   a rectifier circuit configured to rectify an AC voltage to a DC voltage;
   an inverter circuit configured to convert, into an AC voltage, the DC voltage rectified by the rectifier circuit and output the converted AC voltage to a motor;
   a DC link capacitor connected between the rectifier circuit and the inverter circuit;
   a generator configured to generate a signal for controlling the inverter circuit to output, from the inverter circuit, an AC voltage corresponding to a designated phase;
   an estimator configured to estimate a first phase of a rotor of the motor based on a current flowing through the motor; and
   a beat suppression controller configured to output a second phase to the generator as the designated phase so as to suppress a beat component superimposed on the current flowing through the motor, the second phase being obtained by adjusting the first phase.

2. The power conversion device according to claim 1, further comprising a detector configured to detect a pulsation frequency of the rectified DC voltage, wherein the beat suppression controller adjusts the first phase using an integral value of the pulsation frequency.

3. The power conversion device according to claim 1, wherein the beat suppression controller includes a switch configured to switch between a first mode and a second mode, the first mode being a mode in which the second phase is output to the generator as the designated phase, the second mode being a mode in which the first phase is output to the generator as the designated phase.

4. The power conversion device according to claim 2, wherein
   the beat suppression controller includes a switch configured to switch between a first mode and a second mode, the first mode being a mode in which the second phase is output to the generator as the designated phase, the second mode being a mode in which the first phase is output to the generator as the designated phase, and
   the beat suppression controller is configured to reset the integral value to zero before the switch makes switching from the second mode to the first mode.

5. The power conversion device according to claim 1, wherein the power conversion device is applied to an air conditioner.

6. The power conversion device according to claim 2, wherein the beat suppression controller includes a switch configured to switch between a first mode and a second mode, the first mode being a mode in which the second phase is output to the generator as the designated phase, the second mode being a mode in which the first phase is output to the generator as the designated phase.

7. The power conversion device according to claim 2, wherein the power conversion device is applied to an air conditioner.

8. The power conversion device according to claim 3, wherein the power conversion device is applied to an air conditioner.

9. The power conversion device according to claim 4, wherein the power conversion device is applied to an air conditioner.

10. The power conversion device according to claim 6, wherein the power conversion device is applied to an air conditioner.

* * * * *